(12) United States Patent
Hontz

(10) Patent No.: US 10,323,813 B2
(45) Date of Patent: Jun. 18, 2019

(54) LIGHT MODULES FOR HEADLIGHTS

(71) Applicant: Michael E. Hontz, Amory, MS (US)

(72) Inventor: Michael E. Hontz, Amory, MS (US)

( * ) Notice: Subject to any disclaimer, the term of this patent is extended or adjusted under 35 U.S.C. 154(b) by 0 days.

(21) Appl. No.: 15/725,112

(22) Filed: Oct. 4, 2017

(65) Prior Publication Data

US 2018/0094789 A1    Apr. 5, 2018

Related U.S. Application Data

(60) Provisional application No. 62/404,072, filed on Oct. 4, 2016.

(51) Int. Cl.

| F21V 23/00 | (2015.01) |
|---|---|
| F21S 41/19 | (2018.01) |
| F21S 41/20 | (2018.01) |
| F21S 41/141 | (2018.01) |
| B60Q 1/00 | (2006.01) |
| F21S 41/50 | (2018.01) |
| F21S 43/19 | (2018.01) |
| F21S 43/14 | (2018.01) |
| F21S 43/15 | (2018.01) |
| F21Y 115/10 | (2016.01) |
| F21Y 103/30 | (2016.01) |

(52) U.S. Cl.
CPC ............ *F21S 41/19* (2018.01); *B60Q 1/0052* (2013.01); *F21S 41/141* (2018.01); *F21S 41/285* (2018.01); *F21S 41/50* (2018.01); *F21S 43/14* (2018.01); *F21S 43/15* (2018.01); *F21S 43/19* (2018.01); *F21V 23/003* (2013.01); *B60Q 1/0076* (2013.01); *B60Q 2900/10* (2013.01); *B60Q 2900/30* (2013.01); *F21Y 2103/30* (2016.08); *F21Y 2115/10* (2016.08)

(58) Field of Classification Search
CPC .. F21S 48/1104; F21S 48/115; F21S 48/1225; F21V 23/003
See application file for complete search history.

(56) References Cited

U.S. PATENT DOCUMENTS

| 6,550,950 B1* | 4/2003 | Fernandez | B60Q 1/20 362/540 |
|---|---|---|---|
| 2015/0247616 A1* | 9/2015 | Albrecht | F21V 7/0008 362/235 |
| 2015/0252997 A1* | 9/2015 | Hamid | H01L 33/648 362/520 |

* cited by examiner

*Primary Examiner* — Joseph L Williams
(74) *Attorney, Agent, or Firm* — Geoffrey E. Dobbin; Dobbin IP Law P.C.

(57) ABSTRACT

A light ring module may be used to customize headlights for any vehicle. A frame supports at least one LED or another light source and is mounted about a headlight on the vehicle. The light source may be directly hardwired into the vehicle power system or independently powered and controlled. The module may be made to fit any type of vehicle or, alternatively, a bezel may be made to support the module. Such a bezel would be compatible with a given vehicle with mounting points and methods according to the underlying structure. A bezel would also have a slot to support the light ring module and could, optionally, have a lens through which the light may shine.

10 Claims, 5 Drawing Sheets

LIGHT MODULES FOR HEADLIGHTS

CROSS-REFERENCES TO RELATED APPLICATIONS

The present invention claims priority as a non-provisional perfection of prior filed U.S. Application No. 62/404,072, filed Oct. 4, 2017, and incorporates the same by reference herein in its entirety.

FIELD OF THE INVENTION

The present invention relates to the field of illumination and more particularly relates to a lighting unit which is added about a vehicle headlight for visual effect.

BACKGROUND OF THE INVENTION

Vehicle customization is a significant industry. Just as each individual creates his or her own personal image with their fashion and other choices, many desire a personalization of their vehicles. One particular area of customization is to add decorative lights to the vehicle. Of particular note, lights may be added to around the headlight area to create an interesting visual effect. A simple ring lighting module could be employed to efficiently cause this effect. Likewise, a replacement bezel may be constructed with the ability to house such lighting.

The present invention is a ring module designed to fit about a headlight in a vehicle. The present invention represents a departure from the prior art in that the light modules of the present invention allows for customization of a vehicle without replacing headlight structures, including the headlight bezel or the lamp itself.

SUMMARY OF THE INVENTION

In view of the foregoing disadvantages inherent in the known types of customized lighting for a vehicle, this invention provides a simple ring module easily attached to a vehicle about a headlight. As such, the present invention's general purpose is to provide a new and improved lighting module that is easily installed or removed, has a low power draw and is unobtrusive to the design of the host vehicle.

To accomplish these objectives, the lighting module comprises a frame designed to at least partially circumscribe a vehicle headlight. Lights, preferably LED's, are mounted upon this frame to provide the highlighting effect. Power may be drawn from an individual source or the vehicle power system. Mounting the frame about the headlight may be accomplished through an adhesive or any known mechanical mounting system.

By using LEDs, the modules may be individually powered or may tap into the power system of the vehicle. Such modules may also then be individually controlled or controlled with the lighting system of the vehicle. While it is intended that headlight bezels would not require replacement to use this invention, it should be readily appreciated that such replacement bezels could also be manufactured. Rings, as the term is used in this Specification and the Claims, would include any shape which is designed to at least partially circumscribe a headlight. This would include circles, ovals, rectangles, or any type of regular or irregular polygon and partial (incomplete) forms of these shapes.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

With reference now to the drawings, the preferred embodiment of the light module is herein described. It should be noted that the articles "a", "an", and "the", as used in this specification, include plural referents unless the content clearly dictates otherwise.

Figure 1:
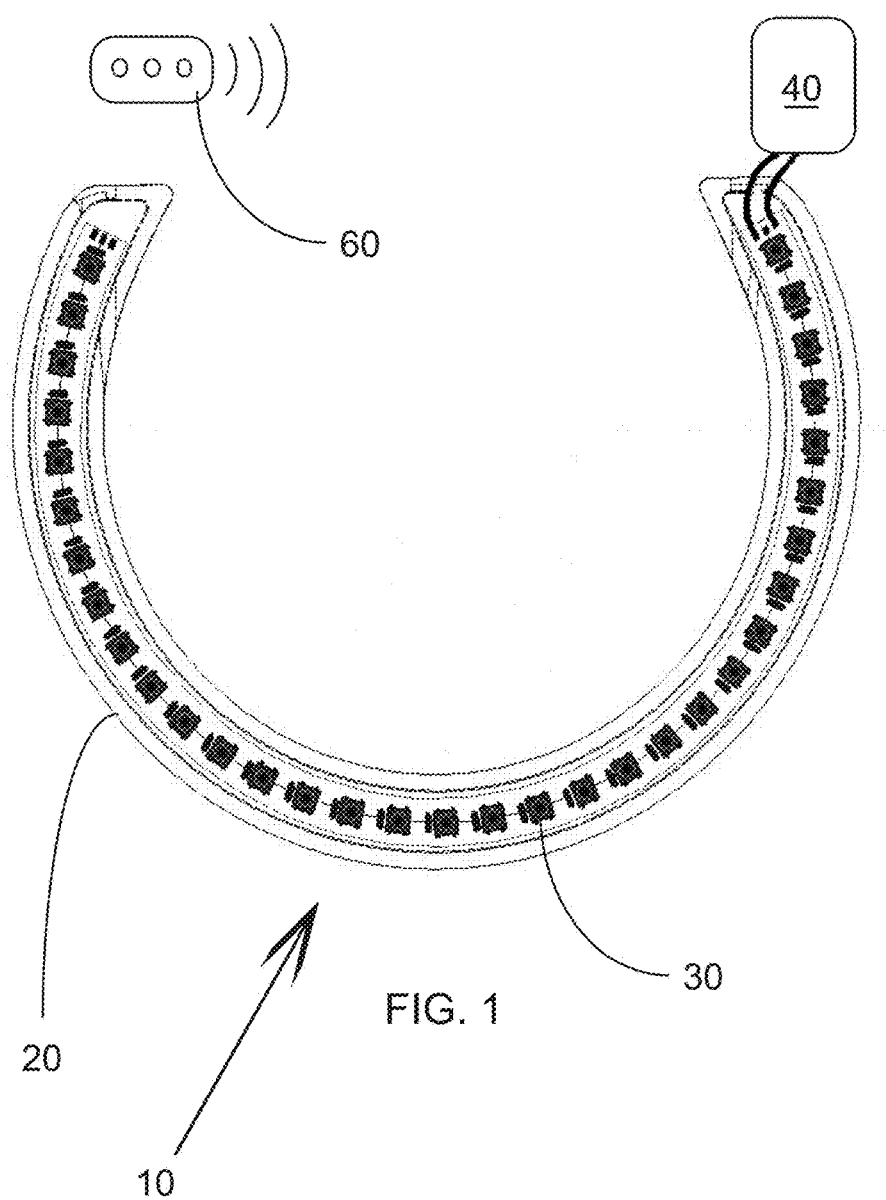
FIG. 1 is a front elevation of a light ring module.
Figure 2:
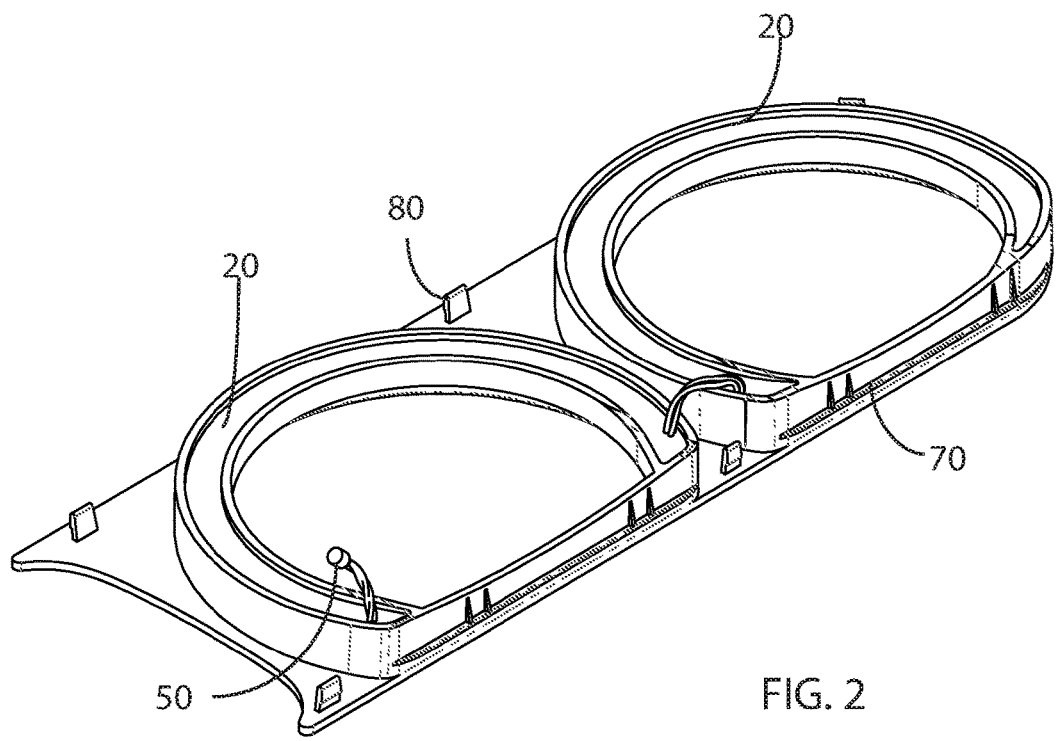
FIG. 2 is a rear perspective view of an alternate bezel, with space for two light ring modules.
Figure 3:
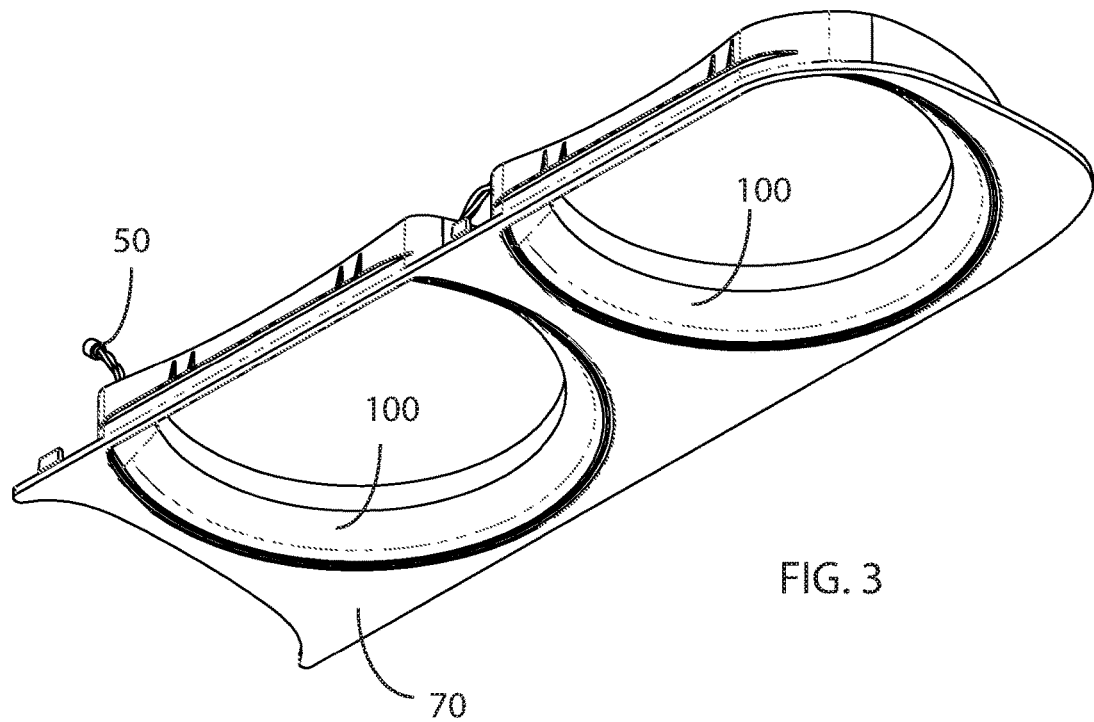
FIG. 3 is a front perspective view of an alternate bezel, with space for two light ring modules.
Figure 4:
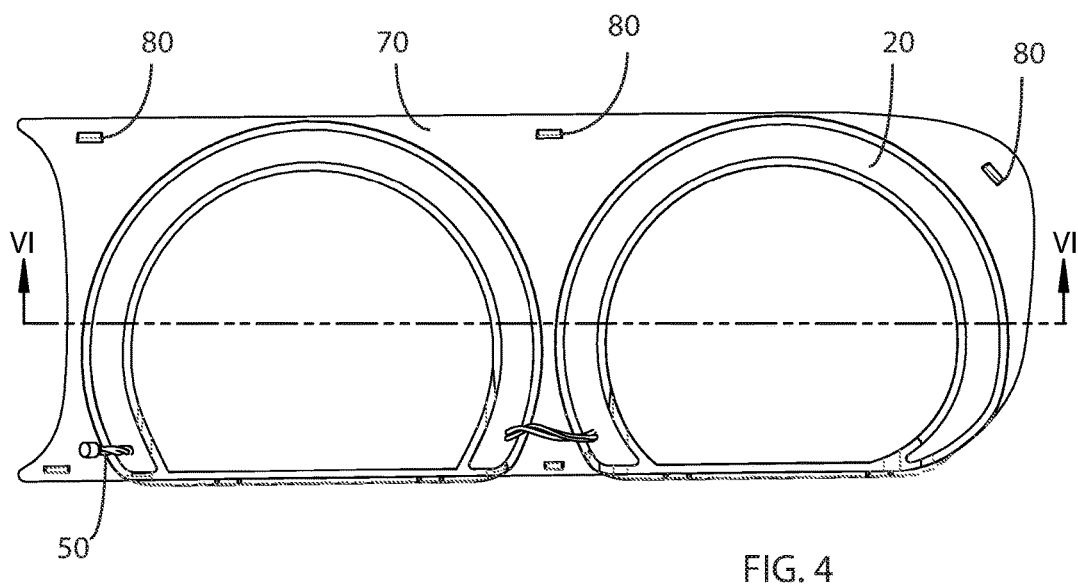
FIG. 4 is a rear elevation of the alternate bezel of FIG. 2.
Figure 5:
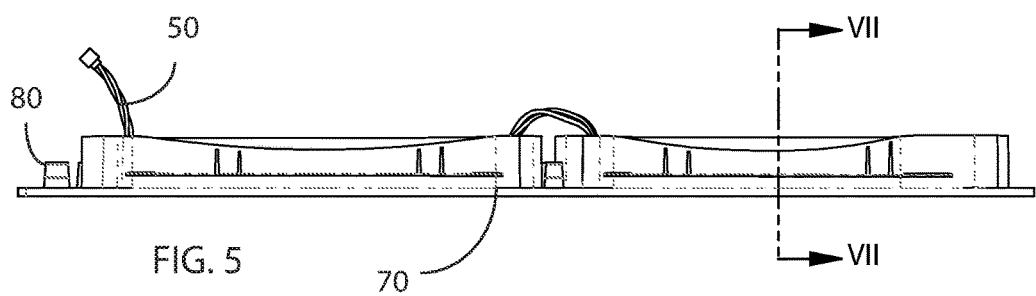
FIG. 5 is a top plan view of the alternate bezel of FIG. 2.
Figure 6:
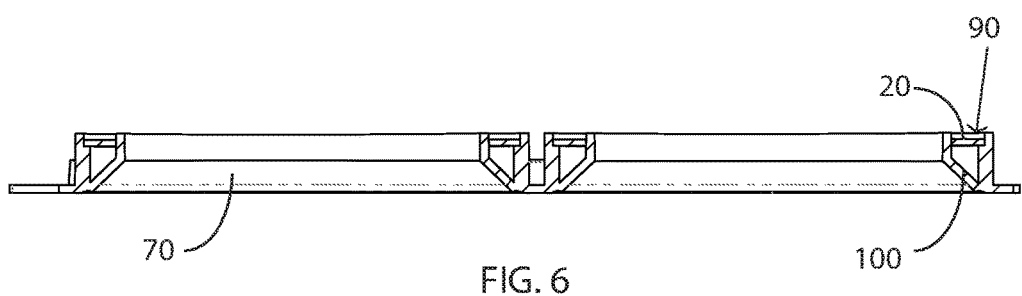
FIG. 6 is a sectional view of the alternate bezel of FIG. 4, taken along line VI-VI.
Figure 7:
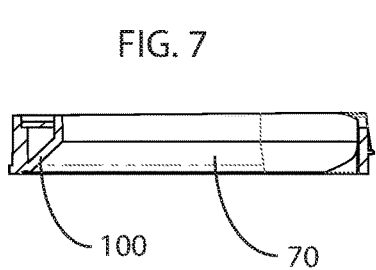
FIG. 7 is a sectional view of the alternate bezel of FIG. 5, taken along line VII-VII.
Figure 8:
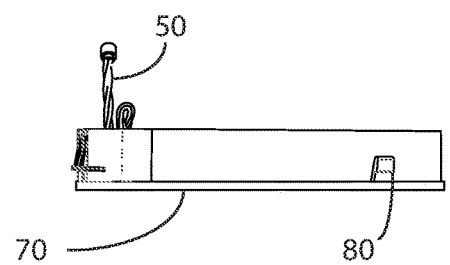
FIG. 8 is a side elevation of the alternate bezel of FIG. 2.
Figure 9:
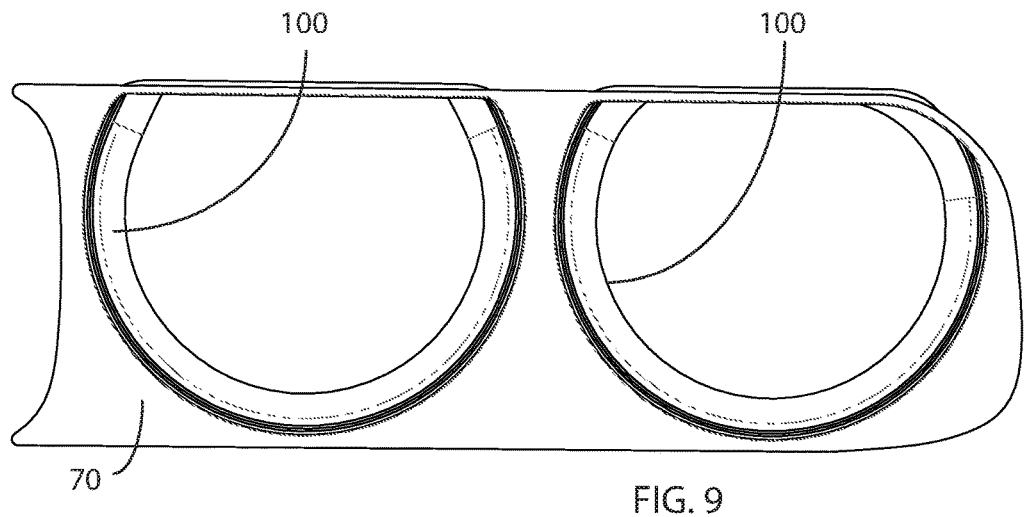
FIG. 9 is a front elevation of the alternate bezel of FIG. 2.
Figure 10:
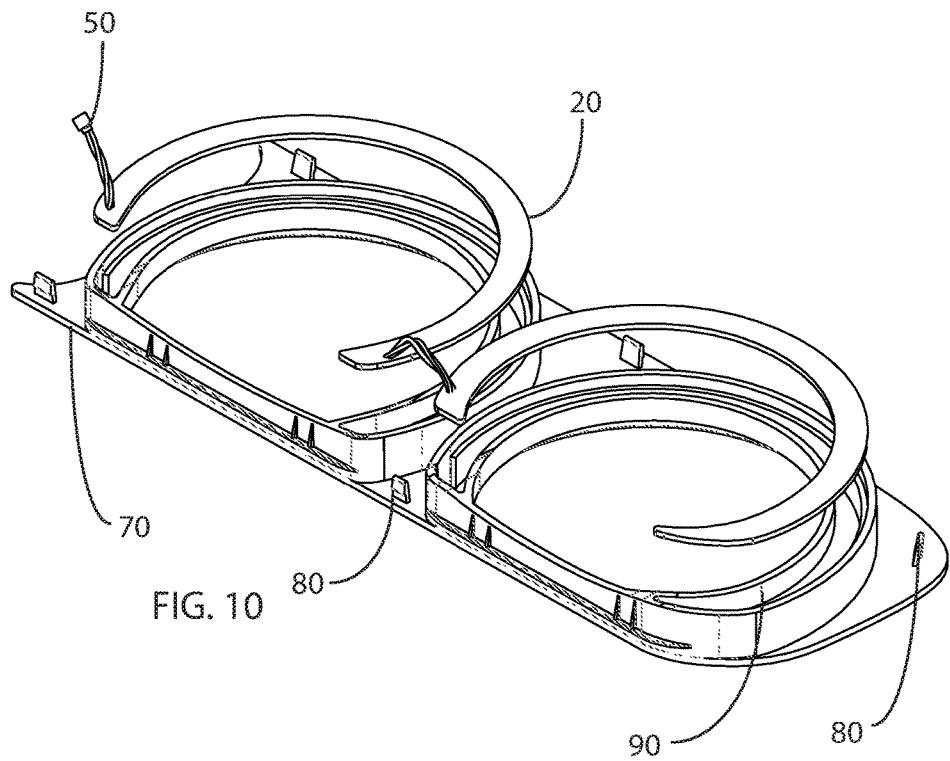
FIG. 10 is an exploded perspective view of the alternate bezel and light ring modules of FIG. 2.
Figure 11:
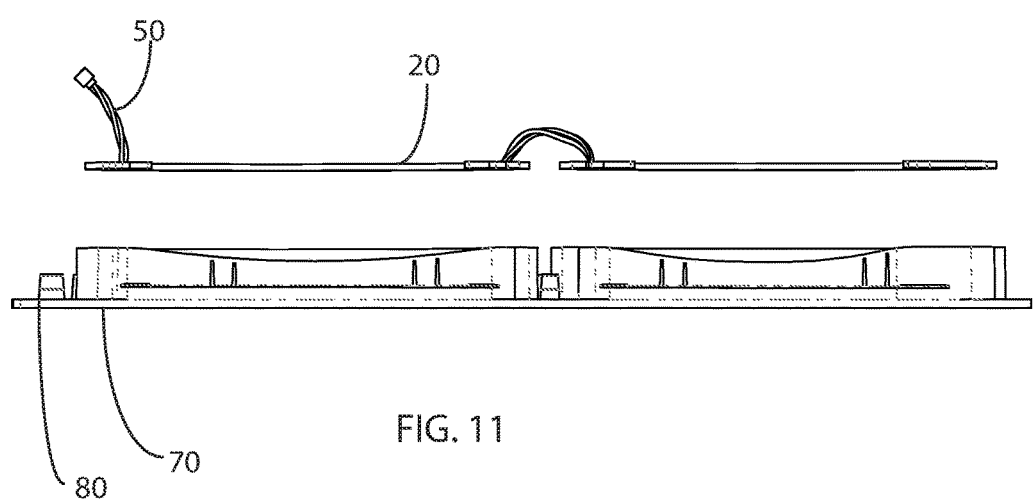
FIG. 11 is a top plan view of the alternate bezel and light ring modules of FIG. 10.

With reference to FIG. 1, a simple light ring module 10 construction could include a frame 20 of appropriate size and shape upon which are mounted a plurality of LEDs 30, or similar light sources, connected in an electrical circuit. The frame 20 is made to comport with the shape and size of a headlight port for a given vehicle, and may be a rigid, semi-rigid or flexible circuit board. As can be seen, the frame 20 does not have to be a complete ring. It is also preferred that emphasis is usually given to the lower part, underneath the headlight, of the ring module 10 as the upper part is usually obscured. In this manner, the ring modules 10 may be properly horseshoe-shaped, U-shaped, ovular, rectangular or be shaped as any polygon and not necessarily circular, and still be considered a "ring." The module may have any color of LEDs 30 and may have a control unit or CPU 40 which may affect a chosen lighting display. The module 10 may have in independent power supply or be hardwired into the vehicle's power system 50. A radio transmitter/receiver 60 may also be utilized to activate or deactivate the module, or select a display setting. Alternatively, the module 10 may be controlled with the vehicle's lighting controls or a separate wired control switch.

For vehicles which do not have space which would support a light module 10, or for further customization options, specialized light bezels 70 may be constructed to hold the module (FIGS. 2-11). Each bezel 70 should have means of attaching to the vehicle at the already existing bezel mount locations for each vehicle. Commonly, this will involve the placement of appropriate tabs 80 at specified locations to interact with the vehicle body as an OEM bezel. Other mounting strategies and equipment would be determined by the vehicle and its method of manufacture and underlying structure. At least one trough 90 is provided to hold a light ring module 10. Each ring light module may be held in place through the use of double sided tape or other adhesives. The bezel 70 may have a lens 100, such as a clear window to allow light thorough the bezel 70. Alternatively, the lens may be partially opaque or may not even be present, leaving a slot through which the LEDs may shine.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A ring light module for vehicles having headlight structures which further comprise a central headlight mounted behind and circumscribed by a bezel, the module comprising:
   a. a support frame shaped and sized to fit within the bezel and, at least partially circumscribing the central headlight;
   b. a plurality of light sources in an electrical circuit mounted upon the support frame; and
   c. a control module to power and control the light sources.

2. The ring light module of claim 1, the light sources being a plurality of LED's.

3. The ring light module of claim 1, the support frame circumscribing a majority of the light of the vehicle along a bottom circumference.

4. The ring light module of claim 1, the support frame being selected from the set of support frame bases consisting of: rigid circuit boards, semi-rigid circuit boards, and flexible circuit boards.

5. The ring light module of claim 1, further comprising a replacement bezel for the vehicle's light, the ring light module fitting within a slot in the replacement bezel such that it at least partially circumscribes the vehicle's light.

6. The ring light module of claim 5, the light sources being a plurality of LED's.

7. The ring light module of claim 5, the support frame circumscribing a majority of the light of the vehicle along a bottom circumference.

8. The ring light module of claim 5, the support frame being selected from the set of support frame bases consisting of: rigid circuit boards, semi-rigid circuit boards, and flexible circuit boards.

9. The ring light module of claim 5, the replacement bezel further comprising a lens through which the plurality of light sources shine.

10. The ring light module of claim 9, the lens being at least partially opaque.

\* \* \* \* \*